(12) United States Patent
Lehmann

(10) Patent No.: US 7,692,914 B2
(45) Date of Patent: Apr. 6, 2010

(54) MICROSYSTEM

(75) Inventor: Mirko Lehmann, Ebnat-Kappel (CH)

(73) Assignee: Micronas GmbH, Freiburg I.BR. (DE)

( * ) Notice: Subject to any disclaimer, the term of this patent is extended or adjusted under 35 U.S.C. 154(b) by 41 days.

(21) Appl. No.: 12/032,862

(22) Filed: Feb. 18, 2008

(65) Prior Publication Data

US 2008/0198528 A1   Aug. 21, 2008

(30) Foreign Application Priority Data

Feb. 16, 2007   (EP)   ................................. 07003299

(51) Int. Cl.
*H01H 43/00*   (2006.01)
(52) U.S. Cl. ...................................... 361/207
(58) Field of Classification Search ................ 361/139, 361/161, 207; 324/76.11; 73/146.4
See application file for complete search history.

(56) References Cited

U.S. PATENT DOCUMENTS

| 3,028,869 | A | * | 4/1962 | Jordan et al. | ............ | 134/58 DL |
| 3,955,185 | A |  | 5/1976 | Nishimura | | |
| 6,307,815 | B1 |  | 10/2001 | Polosky et al. | | |
| 6,798,321 | B2 | * | 9/2004 | Hallbjorner | ................... | 335/78 |
| 6,836,029 | B2 | * | 12/2004 | Greenberg et al. | .......... | 307/139 |
| 7,532,475 | B2 | * | 5/2009 | Michel et al. | ................ | 361/704 |
| 2004/0183148 | A1 |  | 9/2004 | Blasko, III | | |
| 2005/0253571 | A1 | * | 11/2005 | Frank et al. | ............... | 324/76.11 |
| 2006/0244568 | A1 | * | 11/2006 | Tong et al. | ................ | 340/10.41 |
| 2006/0290443 | A1 |  | 12/2006 | Chou et al. | | |
| 2007/0125161 | A1 | * | 6/2007 | Bryzek et al. | .............. | 73/146.4 |

OTHER PUBLICATIONS

Lee, Cheng-Chang and Hsu, Wensyang, "Method on Surface Roughness Modification to Alleviate Stiction of Microstructures," Journal of Vacuum Science and Technology, Jul./Aug. 2003, pp. 1505-1510, B 21(4), American Vacuum Society.
Maboudian, Roya and Howe, Roger T., "Critical Review: Adhesion in Surface Micromechanical Structures," Journal of Vacuum Science and Technology, Jan./Feb. 1997, pp. 1-20, B 15(1), American Vacuum Society.
Lam, Tai and Darling, Robert B., "Physical Modeling of MEMS Cantilever Beams and the Measurement of Stiction Force," Modeling and Simulation of Microsystems, 2001, pp. 418-421.

* cited by examiner

*Primary Examiner*—Jared J Fureman
*Assistant Examiner*—Angela Brooks
(74) *Attorney, Agent, or Firm*—The Webb Law Firm

(57) ABSTRACT

A microsystem consists of at least one sensor and/or actuator, a signal processor and/or control mechanism linked therewith, a timer, and an electrical energy storage unit providing a current source for at least the signal processor and/or control mechanism. The signal processor and/or control mechanism has a mode switching mechanism, by means of which it can be set to an operating mode and a resting mode that consumes less current compared with the operating mode. The mode switching mechanism has at least one control signal input which is electrically connected to the timer for application of a mode switching signal. The timer is a mechanical timer, which has at least one micromechanical cantilever, which is coupled with at least one electrical element connected to the at least one control signal input of the signal processor and/or control mechanism in such a way that said electrical element is time-dependently set.

11 Claims, 4 Drawing Sheets

MICROSYSTEM

Figure 1:
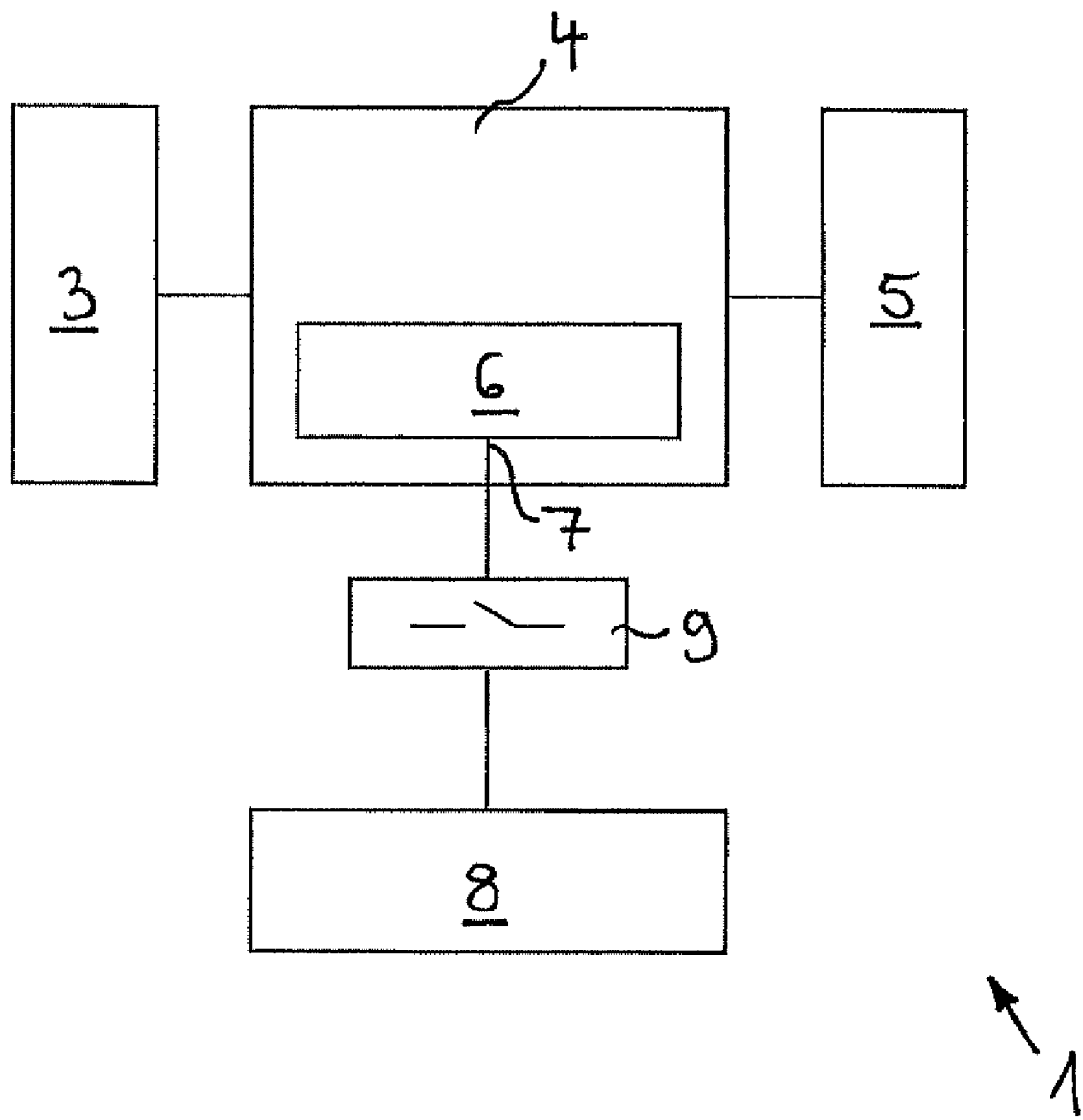

The invention relates to a microsystem consisting of at least one sensor and/or actuator, a signal processor and/or control mechanism linked therewith, and an electrical energy storage unit as a current source for at least the signal processor and/or control mechanism, wherein said signal processor and/or control mechanism has a mode switching mechanism by means of which it is capable of being switched to an operating mode and to a resting mode with reduced power consumption compared with the operating mode, and wherein the mode switching mechanism has at least one control signal input for applying a mode switching signal.

Such a microsystem, in which the sensor has a temperature sensor, is known to the industry. It can be placed on an object, say, a frozen food, in order to monitor its temperature. The microsystem has a semiconductor chip in which a signal processor, a data memory, and an electronic timer are integrated. The semiconductor chip is connected to a battery that serves as a current source. The signal processor has a mode switching mechanism by means of which it is capable of being switched between an operating mode and a resting mode. In the operating mode, a temperature reading from the temperature sensor is read into the signal processor and processed therein. The result of the signal processing is stored in the data memory. Afterwards the signal processor is switched via the mode switching mechanism to the resting mode, in which no signal processing takes place. The power consumption in the resting mode is thus less than in the operating mode. The switching from the resting mode to the operating mode, the so-called waking up of the signal processor, is achieved via a mode switching signal, which is generated by the timer and applied to a control signal input of the mode switching mechanism. In a microsystem in which the signal processor is always operated for only a brief period in the operating mode and always operated for a considerably longer period in the resting mode, the electrical energy consumption of the signal processor can be considerably reduced compared with a signal processor that is operated continuously in the operating mode. However, because the timer still needs to be operated in the resting mode and consumes a considerable amount of operating current, the switching from the operating mode to the resting mode enables only a limited overall saving of electricity.

The object is therefore to develop a microsystem of the aforementioned type, wherein a low current consumption and consequently a compact energy storage unit are possible.

This object is a achieved by a microsystem with the characteristics of claim 1.

The energy for the timer is thus advantageously drawn from a micromechanical cantilever so that practically no electrical energy is needed to operate the timer. The result is a considerable reduction in current consumption by the microsystem, especially in the resting mode. The electrical energy storage unit of the microsystem can therefore have very compact dimensions.

In a preferred embodiment of the invention, the cantilever is attached to a fastener at one of its ends and positioned by means of a surface adhesive force, which diminishes with regard to the reset force of the cantilever material, with its other end against a counter contact arranged opposite the cantilever in such a way that the latter electrically contacts the former. The retention force acting on the cantilever gradually diminishes after the positioning of the cantilever against the counter contact until it is ultimately less than the reset force of the cantilever, resulting in the actuation or opening of the latter after a predetermined time interval elapses.

In an advantageous embodiment of the invention, the timer has at least two of the arrays consisting in each case of the cantilever and its respective counter contact, wherein the cantilevers and the counter contacts are configured and/or positioned against each other in such a way that they separate from each other at different times. It is even possible for the microsystem to comprise a plurality of such cantilevers and for the individual cantilevers to be actuated in intervals of, for example, approximately one minute. By means of the cantilevers, an electric circuit can be closed or interrupted and/or an electrical capacitance altered so that it constitutes a measurement for the time. The mode switching mechanism for activating the operating mode can then be actuated depending on the current flow in the circuit and/or depending on the capacitance.

In a preferred embodiment of the invention, at least two of the arrays consisting of the cantilever and the counter contact have a different surface topology at the point where cantilever and counter contact touch. These surface topologies can be selected so that the individual cantilevers are actuated after different time intervals.

Different surface topologies can be achieved by subjecting the surfaces of the individual cantilevers and/or counter contacts to different physical treatments during the manufacture of the microsystem. Such a physical treatment can comprise, for example, at least one etching step, especially a plasma etching step. It is thus possible to select different lengths of time for the etching step for the individual cantilevers and/or counter contacts.

It is advantageous if in at least one of the arrays consisting of the cantilever and its respective counter contact, there are recesses in a surface area of the cantilever positioned against the counter contact and/or in a surface area of the counter contact positioned against the cantilever. Such recesses can be easily formed in the surface area by lithographic means during the manufacture of the microsystem.

In an advantageous embodiment of the invention, the recesses in the surface areas of at least two cantilevers and/or counter contacts have different cross-sectional dimensions. It is thus especially possible for the individual cantilevers to switch after different time intervals after they have been positioned against their respective counter contacts in each case.

The recesses in at least two cantilevers and/or at least two counter contacts are advantageously configured differently and especially have different spacings between each other and/or a different thickness. Different switching times for the individual micromechanical cantilevers can also be set by this means.

It is advantageous when at least two cantilevers have a different spring constant. This is especially achievable if the cross-sectional dimensions of the individual cantilevers are different. Because of the different spring constants, reset forces of different strengths are created in the individual cantilevers, i.e., the time interval between the cantilever coming into contact with its respective counter contact and the cantilever opening is different for each individual cantilever.

The distance between the end attached to the fastener and the end positioned against the counter contact can be different in at least two cantilevers. A different time interval between the closing and the opening of the cantilever is also achieved for each individual cantilever by this means.

In a functional embodiment of the invention, at least two cantilevers and/or at least two counter contacts have different materials in the surface areas on which the cantilevers are positioned against their respective counter contacts. Preference is given to the consideration of silicon, silicon nitride, silicon oxide, and metals such as aluminum and/or noble metals as materials.

It should still be mentioned that the time interval between the closing and opening of a cantilever is also influenced by the mass of the cantilever and that individual cantilevers can have different masses. Furthermore, the time interval is influenced by the force with which the cantilever is positioned against the counter contact in the programming.

Figure 2:
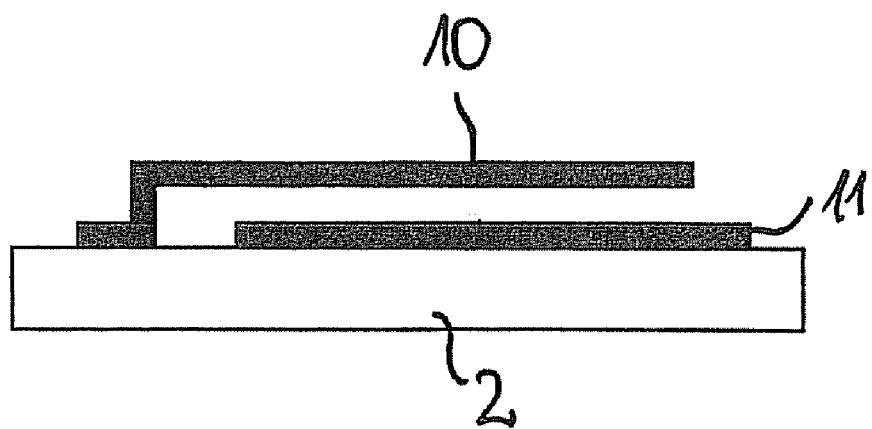
Figure 3:
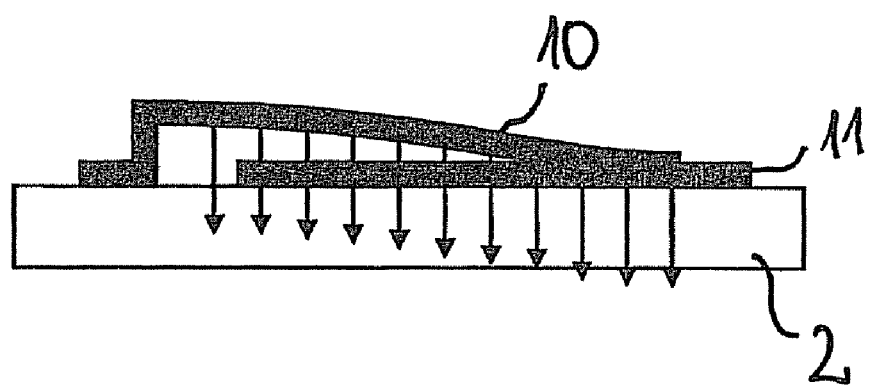
Figure 4:
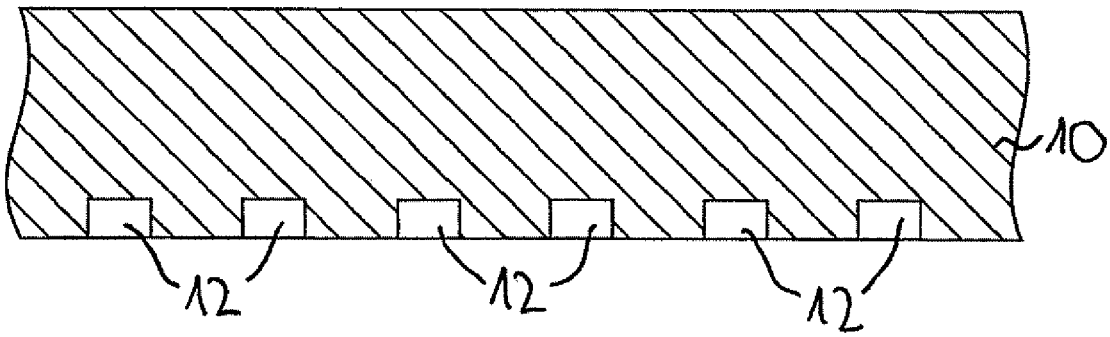
Figure 5:
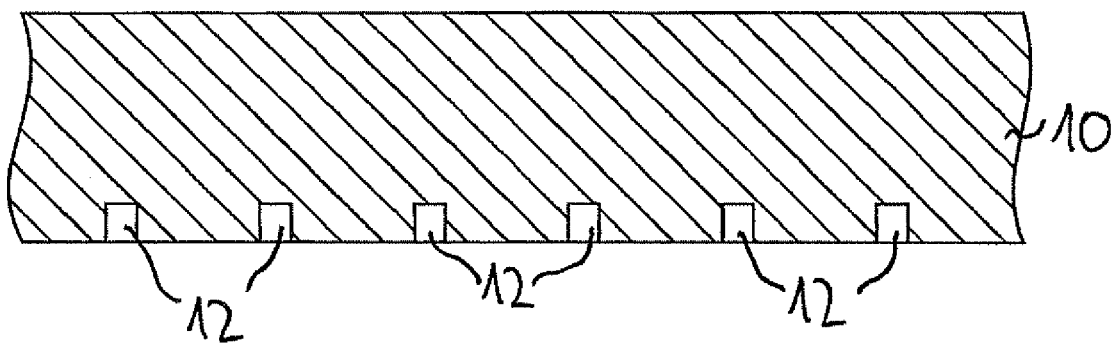
Figure 6:
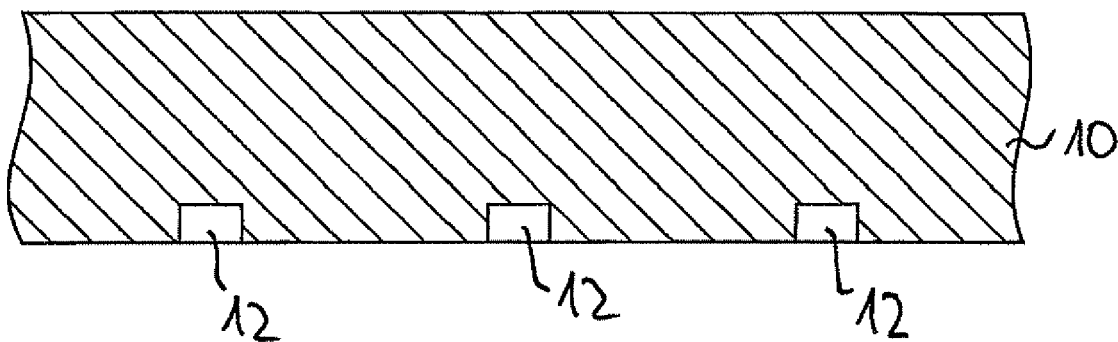
Figure 7:
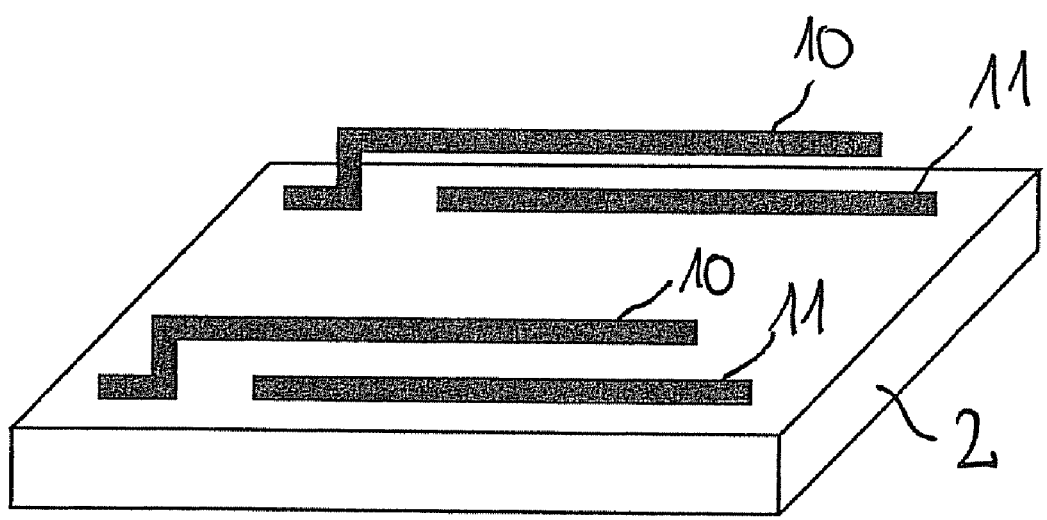

In the following, illustrative embodiments of the invention are explained in more detail with reference to the drawing. Shown are:

FIG. 1 a schematic illustration of a microsystem comprising a microcontroller,

FIG. 2 an unprogrammed cantilever,

FIG. 3 a cantilever during programming,

FIGS. 4 through 6 partial longitudinal sections of cantilevers having different surface structures, and FIG. 7 unprogrammed cantilevers.

A microsystem designated in its entirety by 1 in FIG. 1 has a sensor 3 on a semiconductor chip 2 to capture a physical quantity, for example, temperature and/or atmospheric humidity, and a signal processor and/or control mechanism 4, which is configured as a microcontroller and linked to the sensor 3. Current supply connections for the signal processor and/or control mechanism 4 are connected to an electrical energy storage unit 5, for example, a microbattery or a storage cell.

The signal processor and/or control mechanism 4 has a mode switching mechanism 6 by means of which it is capable of being set to an operating mode and to a resting mode. In the operating mode, the sensor 3 is controlled by an operating program running in the signal processor and/or control mechanism 4 in such a way that it provides an electrical measurement signal at a measurement signal output. The measurement signal is applied to a measurement signal input of the signal processor and/or control mechanism 4 and processed in the signal processor and/or control mechanism 4. The signal processing can comprise, for example, a filtering operation and/or a verification of the plausibility of the measurement signal. A reading obtained via the signal processing is stored in a data memory integrated in the semiconductor chip 2.

As soon as a data capture cycle is complete, the mode switching mechanism 6 is switched to the resting mode by the operating program. The sensor 3 and parts of the signal processor and/or control mechanism 4 are switched off in the resting mode, so that the signal processor and/or control mechanism 4 only consumes a very low amount of current.

The data capture and processing is always cyclically repeated after a prespecified time interval. To this end, the mode switching mechanism 6 has a control signal input 7, which is connected to an adjustable electrical element 9 for applying a mode switching signal. The electrical element 9 is always set via a micromechanical timer 8 after the prespecified time interval has elapsed, in order to awaken the signal processor and/or control mechanism 4.

As mechanical energy storage units, the timer 8 has a plurality of cantilevers 10 which control the electrical element 9. Each cantilever 10 is attached to the semiconductor chip 2 at one of its ends, for example, by a bonding point. At its free end remote from this end, the cantilever 10 is always positioned against a counter contact 11 by a surface adhesive force acting in opposition to the reset force of the cantilever material.

The surface adhesive force is influenced by a structuring, which is only schematically illustrated in FIGS. 4 through 6, of the surface areas of the cantilever 10 and/or the counter contact 11 resting in contact with each other. After the cantilever 10 is brought into contact with the counter contact 11, the surface adhesive force always diminishes gradually. As soon as the surface adhesive force becomes less than the reset force of the cantilever 10, the cantilever 10 releases and flips from the closed position (FIG. 3) to the open or resting position (FIG. 2).

It can be discerned in FIGS. 4 through 6 that the surface structuring of the cantilever 10 has recesses 12, which have different cross-sectional dimensions in the individual cantilevers 10 and/or are separated from each other by varying distances. By means of the recesses 12, the surface area resting on the counter contact 11 and consequently the time required by the cantilever 10 to return to its resting position (FIG. 2) after having been brought into contact with the counter contact 11 is reduced in each case.

In each case a voltage is capable of being applied to a control signal input 7 of the mode switching mechanism 6 via the individual cantilevers 10. With each change of the voltage pattern applied to the control inputs 7, the signal processor and/or control mechanism 4 is awakened from the resting mode, in order to capture a reading and store it in the data memory.

In the fabrication of the microsystem 1, the cantilevers 10 are switched by means of a programming voltage applied between the cantilever 10 and the counter contact 11 from the open position (FIG. 2) to the closed position (FIG. 3) in such a way that, after subsequent removal of the programming voltage, they remain for a prespecified time interval in the closed position and then independently return to the open position. The programming voltage is set sufficiently high so that the force exerted by the electric field (represented by arrows in FIG. 3) residing between the cantilever 10 and the counter contact 11 is greater than the reset force of the cantilever 10.

The invention claimed is:

1. A microsystem, comprising:
at least one sensor and/or actuator,
a signal processor and/or control mechanism linked therewith,
a timer, and
an electrical energy storage unit as a current source for at least the signal processor and/or control mechanism, wherein the signal processor and/or control mechanism has a mode switching mechanism by means of which it can be set to an operating mode and to a resting mode with reduced current consumption compared with the operating mode, and wherein the mode switching mechanism has at least one control signal input which is electrically connected with the timer for applying a mode switching signal, characterized in that the timer is a mechanical timer which has at least one micromechanical cantilever which is coupled with at least one electrical element electrically connected to the at least one control signal input of the signal processor and/or control mechanism in such a way that said electrical element is time-dependently set, wherein the cantilever comprises an energy store of the timer that is operative for delaying the cantilever's return to a resting position from a contact position.

2. The microsystem as in claim 1, characterized in that the cantilever is attached to a fastener at one of its ends and positioned by means of a surface adhesive force, which diminishes with regard to the reset force of the cantilever material, with its other end against a counter contact allocated to the cantilever in such a way that the latter electrically contacts the former.

3. The microsystem as in claim 2, characterized in that the distance between the end attached to the fastener and the end positioned against the counter contact is different in at least two cantilevers.

4. The microsystem as in claim 2, characterized in that at least two cantilevers and/or at least two counter contacts have different materials in the surface areas on which the cantilevers are positioned against their respective counter contacts.

5. The microsystem as in claim 1, characterized in that the timer has at least two arrays consisting in each case of the cantilever and its respective counter contact, and in that the cantilever and the counter contact are configured and/or positioned against each other in such a way that they separate from each other at various times.

6. The microsystem as in claim 5, characterized in that at least two of the arrays consisting of the cantilever and the counter contact have a different surface topology on the place where the cantilever and the counter contact touch.

7. The microsystem as in claim 5, characterized in that in at least one of the arrays consisting of the cantilever and its respective counter contact, there are recesses in a surface area of the cantilever positioned against the counter contact and/or in a surface area of the counter contact positioned against the cantilever.

8. The microsystem as in claim 7, characterized in that the recesses in the surface areas of at least two cantilevers and/or counter contacts have different cross-sectional dimensions.

9. The microsystem as in claim 7, characterized in that in at least two cantilevers and/or in at least two counter contacts, the recesses in the surface areas are arranged differently and especially have different spacings from each other and/or a different thickness.

10. The microsystem as in claim 1, characterized in that at least two cantilevers have a different spring constant.

11. The micro system as in claim 1, characterized in that the sensor and/or actuator, the signal processor and/or control mechanism, and the mechanical timer are integrated in a semiconductor chip.

* * * * *